United States Patent [19]

Heinzen

[11] Patent Number: 5,201,529
[45] Date of Patent: Apr. 13, 1993

[54] SEALING DEVICE

[75] Inventor: Stephen R. Heinzen, Morton Grove, Ill.

[73] Assignee: NOK Corporation, Tokyo, Japan

[21] Appl. No.: 768,254

[22] PCT Filed: Feb. 16, 1991

[86] PCT No.: PCT/JP91/00193
§ 371 Date: Oct. 15, 1991
§ 102(e) Date: Oct. 15, 1991

[30] Foreign Application Priority Data

Feb. 16, 1990 [JP] Japan .................. 2-14544[U]
Jun. 15, 1990 [JP] Japan .................. 2-63339[U]

[51] Int. Cl.5 .............................................. F16J 15/34
[52] U.S. Cl. .................................. 277/37; 277/57; 277/153
[58] Field of Search .............. 277/35, 37, 53, 57, 277/134, 152, 153, 50

[56] References Cited

U.S. PATENT DOCUMENTS

| 3,341,265 | 9/1967 | Paterson | 277/37 |
| 4,448,426 | 5/1984 | Jackowski | 277/37 |
| 4,531,748 | 7/1985 | Jackowski | 277/166 |
| 4,550,920 | 1/1985 | Matsushima | 277/134 |
| 4,667,967 | 5/1987 | Deuring | 277/53 |
| 4,856,794 | 8/1989 | Boyers et al. | 277/37 |
| 4,962,936 | 10/1990 | Matsushima | 277/152 |
| 4,981,303 | 1/1991 | Matsushima et al. | 227/35 |
| 5,004,248 | 4/1991 | Messenger et al. | 277/37 |

FOREIGN PATENT DOCUMENTS 63-96377 6/1988 Japan .
1-171970 12/1989 Japan .

Primary Examiner—William A. Cuchlinski, Jr.
Assistant Examiner—Daniel G. DePumpo
Attorney, Agent, or Firm—Kenyon & Kenyon

[57] ABSTRACT

A sealing device provides sealing between two members adapted for relative concentric motion. The main seal comprises a pair of annual seal members attached respectively to the two members. An auxiliary seal serves to prevent the intrusion of foreign matter into the main seal. The auxiliary seal comprises a minute gap having a spiral flow passage which exerts a screw pump action to discharge external foreign matter to the side opposite to the main seal due to relative rotation. The main seal includes a first seal member having a radially extending flange portion abutting an end surface of a housing. The main seal includes a second seal member having a radially extending portion opposed to the radially extending flange portion of the first seal member. A buffer portion for buffering axial load is located between the flange portion and the radially extending portion.

20 Claims, 7 Drawing Sheets

SEALING DEVICE

TECHNICAL FIELD

The present invention relates to a rotary sealing device to be used in rotating shaft bearing portions, for example, in the differential gear section, transmission, etc. of an automobile, and, in particular, to a unitized sealing device.

BACKGROUND ART

FIG. 11 shows an example of a conventional sealing device of this type. The reference numeral 100 generally indicates the device shown, which comprises a first annular seal member 102 fitted onto a rotating shaft 101 that is schematically shown and a second annular seal member 104 fitted in the inner periphery of an axle hole 103a of a housing 103. Provided between the first seal member 102 and the second seal member 104 are a main seal portion 105 for sealing up an object of sealing 0 which consists, e.g., of oil, and an auxiliary seal portion 106 for preventing foreign matter, such as external contaminants, from intruding into this main seal portion 105. Employed in this auxiliary seal portion 106 is a seal lip 107, which is a contact-type seal adapted to be in sliding contact with the associated sliding surface.

The above-described prior-art device, however, has the following problem, which is due to the employment of the seal lip 107 in the auxiliary seal portion 106.

First, under a high-speed rotating condition, the heat generation due to the sliding friction of the seal lip 107 becomes excessive, with the result that the material of the seal lip 107, which consists, e.g., of rubber, deteriorates, which leads to a premature failure such as seal leakage.

Second, due to the presence of the seal lip 107, the cavity portion 108 between the auxiliary seal portion 106 and the main seal portion 105 exists as a sealed space with poor permeability. As a result, moisture condenses in this cavity portion 108, which may cause corrosion, etc. of the metal portions.

In view of this, a non-contact seal, such as a labyrinth seal, might be used in the auxiliary seal portion 106, as shown in FIG. 12. However, though it can reduce the intrusion of external contaminants, a non-contact seal will deteriorate extremely in sealing performance if the gap thereof is too large, so that the size of the gap must inevitably be limited. Further, in use, such a unitized device must be able to tolerate any change in the assembly condition on the side of the user, i.e., a dynamic eccentricity, such as a precessional movement or an offset between the rotating shaft 101 and the axle hole 103a. Thus, in the case where a non-contact-type seal is used in the structure of the auxiliary seal portion 106, there are two requirements, which it has been impossible to satisfy at the same time. That is, the gap must be made small in order to ensure the sealing property, whereas it must be made large in order to tolerate a dynamic eccentricity.

Further, in such a unitized sealing device, there is provided between the first seal member 102 and the second seal member 104 a buffer portion 109 for buffering the axial load generated when mounting the rotating shaft 101 by passing it through the inner periphery of the second seal member 104.

However, the buffer portion 109 of conventional type is arranged inside the axle hole 103a of the housing 103, and has the following problems:

First, the thrust load when mounting the shaft acts directly on the abutting portions of the first and second seal members 102 and 104 through the intermediation of the buffer portion 109 as an axial load, with the result that the portions on which the load acts are deformed, which may cause the seal to become defective.

Further, there is a risk that the heat generated in this buffer portion 109 as a result of the sliding during rotation will be transmitted to the seal lip 107 to cause premature deterioration of the material, thus leading to a short service life. A buffer structure of this type is disclosed, for example, in U.S. Pat. No. 4,531,748.

The present invention has been made to solve the above problems in the prior art. It is accordingly an object of this invention to provide a unitized sealing device which employs a non-contact-type seal in the auxiliary seal portion to eliminate the problem of frictional heat generation, torque loss, etc., and, at the same time, the auxiliary seal portion of which has an enhanced foreign matter discharging ability to make it possible to improve the sealing property with respect to foreign matter while tolerating dynamic eccentricities.

Another object of this invention is to provide a unitized sealing device in which the axial load acting on the second seal member when mounting the shaft is prevented from being directly applied to the first seal member, and which can prevent the heat generated in the buffer portion as a result of the sliding during rotation from being transmitted to the seal portions.

DISCLOSURE OF INVENTION

In accordance with this invention, there is provided a sealing device for effecting sealing between two members making a concentric relative rotation, of the type including: a pair of annular seal members relatively attached to said two members, a main seal portion which seals up an object of sealing, an auxiliary seal portion which is provided on the opposite side of the object of sealing with respect to the main seal portion and which serves to prevent intrusion of external foreign matter into the main seal portion;

wherein the auxiliary seal portion consists of a minute gap having a spiral flow passage which exerts a screw pump action to discharge foreign matter to the side opposite to the main seal portion by the relative rotation of the two seal members.

In this sealing device, constructed as described above, the minute gap in the auxiliary seal portion prevents intrusion of external foreign matter, and, when in a rotating condition, the screw pump action of the spiral flow passage generates a fluid flow towards the side opposite to the object of sealing, any external foreign matter being discharged by this fluid flow. Further, in the auxiliary seal portion, the first and second seal members are out of contact with each other by virtue of the minute gap, so that, even under a high-speed rotating condition, the frictional heat generation, torque loss, etc due to solid contact can be substantially reduced.

Further, since the cavity portion between the main seal portion and the auxiliary seal portion communicates with the atmospheric air through the minute gap, a satisfactory permeability is obtained, with no condensation of moisture, etc. being involved. Accordingly, water drop adhesion, etc. in the cavity portion can be prevented, thereby making it possible to restrain rusting.

Furthermore, instead of merely adopting a non-contact structure, the device is so designed that foreign matter is positively repelled by the screw pump action of the spiral flow passage, so that the sealing property can be ensured even when the minute gap is enlarged, thus making it possible to obtain a satisfactory sealing property while tolerating dynamic eccentricities such as precession.

Further, in a sealing device of the type in which seal portions in a slidable sealing contact with other are formed between a first seal member fitted fluid-tight into the inner periphery of an axle hole of a housing and a second seal member fitted fluid-tight onto a shaft inserted into the housing axle hole in such a manner as to allow relative rotation, the above-mentioned first seal member is equipped with a flange portion, which is formed by bending the first seal member radially outwards with respect to an outer peripheral fitting portion thereof fitted into the inner periphery of the housing axle hole and which is abutted against an end surface of the housing, and the above-mentioned second seal member is equipped with a radially extending portion situated on the opposite side of the object of sealing with respect to the flange portion, a buffer portion for buffering the axial load being provided between the flange portion and the radially extending portion, the above-mentioned buffer portion being arranged radially on the outer side with respect to the portion around the position where the first seal member is bent into the outer peripheral fitting portion and the flange portion.

With this sealing device, constructed as described above, the assembling operation is performed by first attaching the first seal member to the inner periphery of the housing axle hole and then inserting the shaft into the housing in such a manner as to penetrate the inner periphery of the second seal member.

The axial load applied to the second seal member in this process is buffered by the buffer portion provided between the opposed surfaces of the radially extending portion provided on the second seal member and the flange portion provided on the first seal member. This buffer portion is situated radially on the outer side with respect to the portion around the bending position between the highly rigid outer fitting portion and flange portion, so that the first seal member is unsusceptible to deformation due to the axial load. Thus, the seal defect due to the deformation of the first seal member when mounting the device can be prevented.

In addition, since the buffer portion is situated at a position outside the housing axle hole and away from the seal portions, the heat generated in the buffer portion during operation is not likely to be transmitted to the seal portions, thus avoiding thermal deterioration of the seal portions and ensuring a long service life.

BRIEF DESCRIPTION OF DRAWINGS

FIGS. 1 through 5 show sealing devices in accordance with various embodiments of the present invention, of which:

FIG. 1 is a longitudinal sectional view of the essential part of a first embodiment;

FIG. 2 is a longitudinal sectional view of the essential part of a modification of the first embodiment;

FIGS. 3 and 4 are longitudinal sectional views of the essential parts of still further modifications of the first embodiment;

FIG. 5 is a longitudinal sectional view of the essential part of a second embodiment;

BEST MODE FOR CARRYING OUT THE INVENTION

Figure 1:
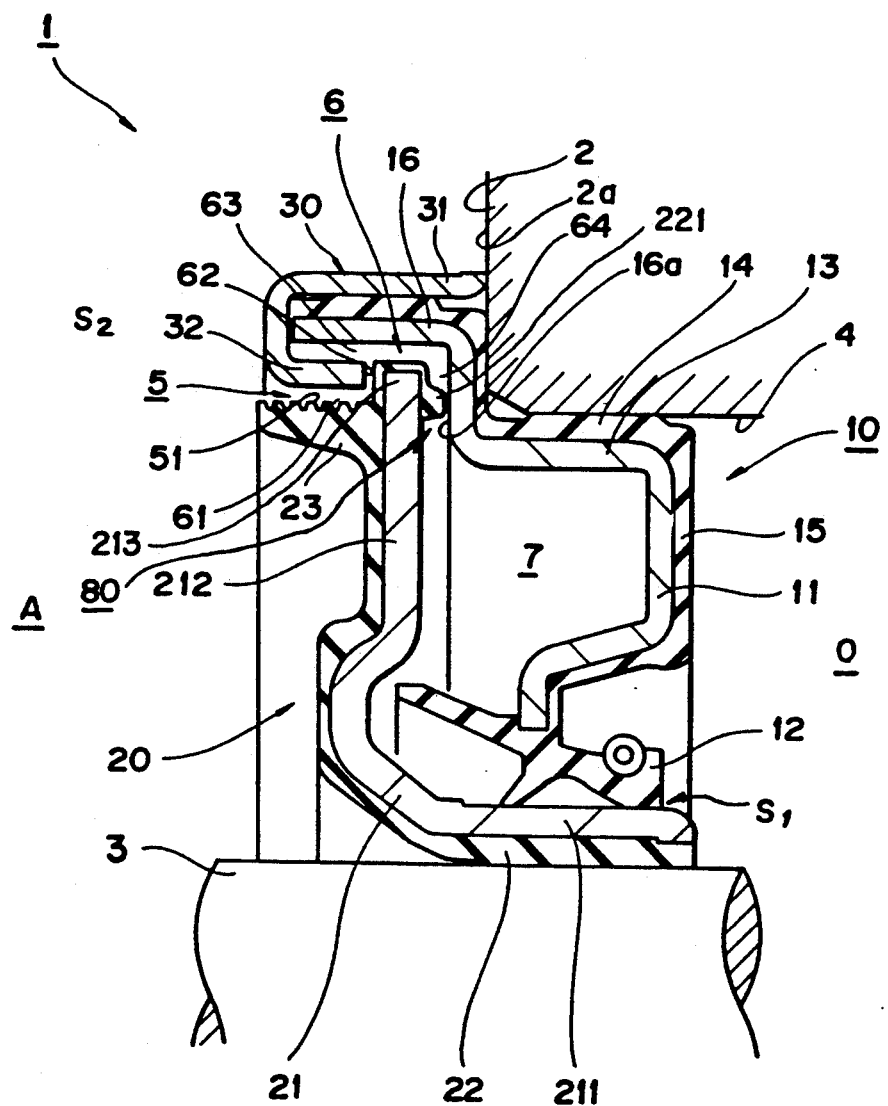

The present invention will now be described with reference to the embodiments shown in the accompanying drawings. Referring to FIG. 1, which shows a sealing device in accordance with the first embodiment of this invention, the reference numeral 1 generally indicates the sealing device. This sealing device serves to seal the gap between a stationary housing 2 and a rotating shaft 3 coaxially inserted into this stationary housing 2, isolating the closed axial inner space on the side of an oil O, which constitutes the object of sealing, from the atmospheric air A, which contains contaminants in both dry and wet conditions.

The sealing device 1 is composed of three integrally assembled components: a first seal member 10 which is attached to the inner periphery of an axle hole 4 of the housing 2; a second seal member 20 which is fixed to the outer periphery of the rotating shaft 3; and an integration metal case 30 for integrating the first and second seal members 10 and 20 with each other.

The first seal member 10 is composed of a main metal case 11 which is fitted into the axle hole 4 of the housing 2, and a radially extending main seal lip 12 which is integrally bonded to this main metal case 11 and which is made of a rubber-like elastic material. The main seal lip 12 is attached to the inner radial end portion of the main metal case 11. Further, an outer peripheral seal portion 14 of a rubber-like elastic material is also integrally bonded to an outer peripheral cylindrical portion 13 of the main metal case 11, thereby improving the sealing property and facilitating the incorporation and assembly. Further, that end surface of the main metal case 11 which is on the side of the oil O to be sealed up is also entirely covered with a film 15 of a rubber-like elastic material.

Further, protruding from the end portion on the side of the atmospheric air A of the outer peripheral cylindrical portion 13 of the main metal case 11 is a stepped case flange portion 16 which is engaged with the end surface 2a of the peripheral portion around the axle hole 4 of the housing 2.

The second seal member 20 is composed of a metal sleeve 21 with an. L-shaped section, which consists of an axially extending portion 211 and a radially extending portion 212, and a rubber-like elastic member 22, which is integrally bonded to this sleeve 21. The cylindrical axially extending portion 211 of the sleeve 21 is attached to the rotating shaft 3 by press fit, so that the sleeve 21 rotates with the rotating shaft 3. The outer peripheral surface of this axially extending portion 211 is in a slidable sealing contact with the main seal lip 12 of the first seal member 10. This lip sliding portion constitutes a main seal portion S₁.

Further, the radially extending portion 212 has a diameter which is larger than the bore diameter of the axle hole 4 of the housing 2, and its outer radial end portion is opposed to the end surface 2a around the opening of the axle hole 4 of the housing 2. Provided between this radially extending portion 212 and the housing end surface 2a is a buffer portion 80 for buffering the axial load acting on this second seal member 20 when mounting the rotating shaft 3. This buffer portion 80 is situated radially on the outer side with respect to the portion around the bending position between the highly rigid case flange portion 16 and the outer peripheral cylindrical portion 13 serving as the outer fitting portion to be fitted into the inner periphery of the axle hole 4.

In this first embodiment, provided on that side of the outer radial end portion 213 of the radially extending portion 212, which faces the housing end surface 2a, is a buffer projection 221 formed of a rubber-like elastic material, which is so designed as to abut against the housing end surface 2a through the intermediation of the case flange portion 16 of the first seal member 10 that is engaged with the housing end surface 2a.

By positioning the contact point of this buffer projection 221 on the outer side with respect to the axle hole 4 of the housing 2, the axial load can be borne by the housing end surface, thus making it possible to reliably prevent the deformation of the first seal member.

Further, the integral bonding of the rubber-like elastic member 22 to the sleeve 21 is effected in such a manner that it covers the inner peripheral surface of the axially extending portion 211 of the sleeve 21, the entire end surface on the side of the atmospheric air A of the flange-like radially extending portion 212, and, further, the upper end portion of the same. A non-contact auxiliary seal portion S₂ is provided between the outer radial end portion of the radially extending portion 212 of this second seal member 20 and the case flange 16 of the first seal member 10.

This auxiliary seal portion S₂ consists of a labyrinth gap 6 formed as a minute gap. Provided in the labyrinth gap 6 is a spiral flow passage 5, which is adapted to exert a screw pump action to discharge any contaminant as external foreign matter to the side opposite to the main seal portion S₁ by the relative rotation of the first and second seal members 10 and 20.

In this embodiment, the labyrinth gap 6 is formed by utilizing an integration metal case 30, which integrates the first and second seal members 10 and 20 with each other. The integration metal case 30 has a horizontal-J-shaped sectional configuration and is equipped with an outer ring portion 31 constituting the longer side of the J-shaped section and an inner ring portion 32 constituting the shorter side of the same, the outer ring portion 31 being fitted onto the outer periphery of the case flange portion 16 of the first seal member 31. The front end of the inner ring portion 32 is so arranged as to face the outer radial end portion of the radially extending portion 212 of the sleeve 21, thereby effecting integration such that the sleeve 21 is prevented from coming off in the axial direction. However, this integration is not so firm as to prevent the relative rotation of the first and second seal members 10 and 20. Further, provided on the outer radial end portion 213 of the radially extending portion 212 of the sleeve 21 is an annular rubber protrusion 23, which is opposed to the above-mentioned inner ring portion 32 through the intermediation of the minute gap.

The labyrinth gap 6 is composed of a first gap 61 which is between the annular protrusion 23 and the inner ring portion 32 of the integration metal case 30, a second gap 62 which is between the front end surface of the inner ring portion 32 and the outer radial end portion of the radially extending portion 212 of the sleeve 21, a third gap 63 which is between the inner peripheral surface of the case flange portion 16 of the first seal member 10 and the outer radial end surface of the radially extending portion 212 of the sleeve 21, and a fourth gap 64 which is between the buffer projection 221 provided on the radially extending portion 212 of the sleeve 21 and the step portion 16a of the case flange portion 16 of the first seal member 10.

Formed on the outer peripheral surface of the rubber protrusion 23 constituting the first gap 61 of this labyrinth gap 6 is a spiral groove 51, which constitutes the spiral flow passage 5 of the present invention together with the inner peripheral surface of the inner ring portion 32 of the integration metal case 30 opposed thereto.

The size of the labyrinth gap 6 is so determined as to be able to tolerate dynamic eccentricities, such as precessional movement of the rotating shaft 3 and offset of the housing axle hole 4.

In this sealing device constructed as described above, the oil O, constituting the object of sealing, is sealed up by the main seal portion S₁ where the main seal lip 12 effects sealing contact, and contaminants from the outside, such as dust, are sealed off by the auxiliary seal portion S₂ and prevented from intruding into the main seal portion S₁. Further, since the cavity portion 7 between the first seal member 10 and the second seal member 20 communicates with the atmospheric air A through the labyrinth gap 6, moisture condensation in the cavity portion 7 can be prevented.

In the auxiliary seal portion S₂, contaminants from the outside are sealed off by the labyrinth gap 6, and, at the same time, are discharged to the atmospheric air A by a fluid pumping action in the first gap 61. The fluid pumping action is an action which, in the first gap 61, creates a flow which forces the fluid back to the atmospheric air A by utilizing the relative rotating movement of two closely arranged opposed portions: the inner peripheral surface of the inner ring portion 32 of the integration metal case 30 and the spiral groove 51 provided on the outer peripheral surface of the rubber protrusion 23. The higher the rotating speed of the rotating shaft 3, the stronger becomes this fluid pumping action to enhance the sealing property. Furthermore, since a non-contact type seal is employed, the heat generation, torque loss, etc. are substantially reduced as compared to the case where a contact-type seal is employed.

Further, in the assembling operation, in which the first seal member 10 is first attached to the inner periphery of the axle hole 4 of the housing 2, and then, the rotating shaft 3 is inserted into the housing 2 in such a manner as to penetrate the inner periphery of the second seal member 20, the axial load applied in this process to the second seal member 20 is buffered by the buffer portion 80 that is provided between the radially extending portion 212 formed on the second seal member 20 and the housing end surface 2a, and is not applied to the first seal member 10. Accordingly, there is no risk that the first seal member 10 will be deformed by the axial load to cause a change in the contact condition of the seal lip 12, thus making it possible to maintain a satisfactory seal performance.

Further, by thus providing the buffer portion 80, the labyrinth gap 6 of the auxiliary seal portion $S_2$ is kept constant, thus also allowing the seal performance of the auxiliary seal portion $S_2$ to be maintained satisfactory.

Figure 2:
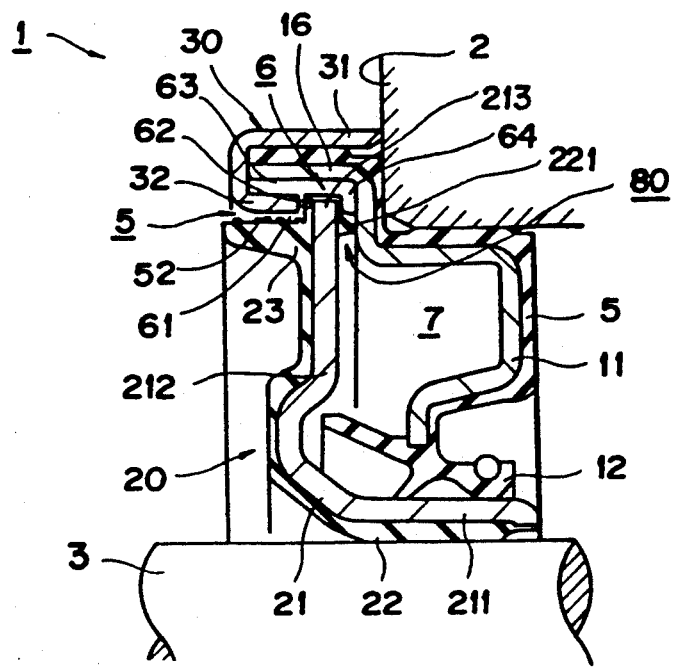

FIG. 2 shows a modification of the first embodiment of FIG. 1. In this modification, the spiral flow passage 5 of the auxiliary seal portion $S_2$, which exerts the fluid pumping action, is not formed by providing a spiral groove 51 on the rubber protrusion 23 as in the first embodiment. Instead, it is formed by providing a spiral projection 52. Apart from this, this structure is the same as that of FIG. 1, so the same reference numerals are used for the identical components, a description of which is omitted.

Figure 3:
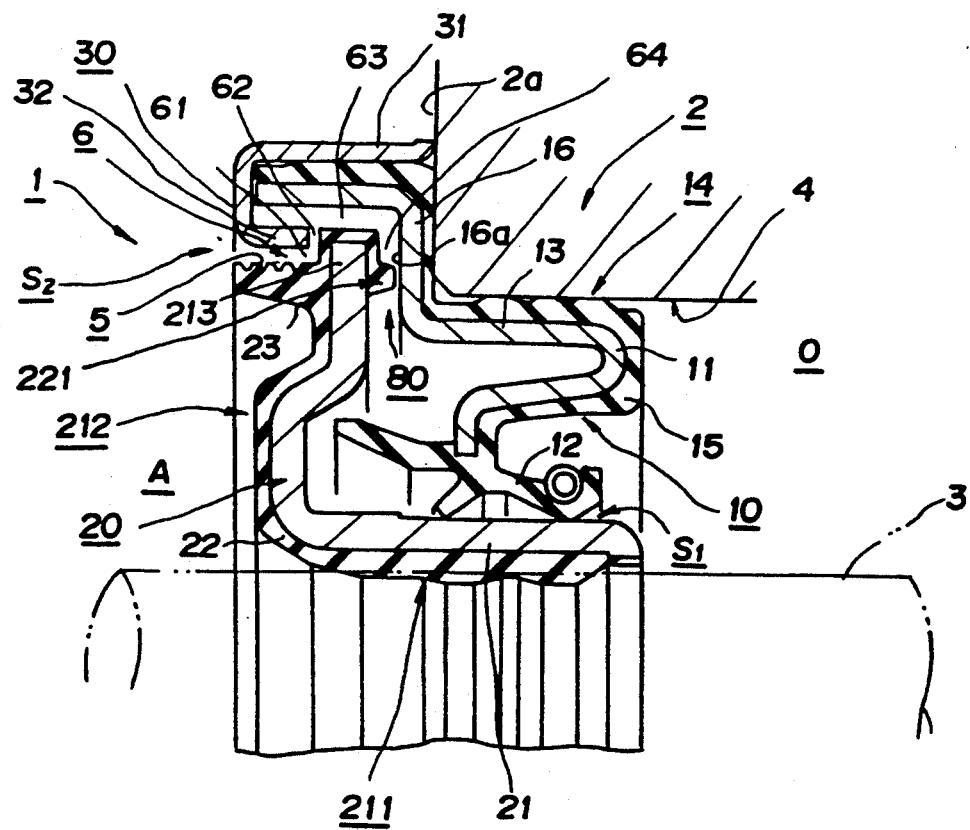

FIG. 3 shows a modification of the structure of FIG. 1. This modification is intended for the case where the dimension of the gap between the periphery of the axle hole 4 of the housing 2 and the rotating shaft 3 is small. Since it has basically the same structure as that of FIG. 1, the same reference numerals are used for the identical components, a description of which is omitted.

Figure 4:
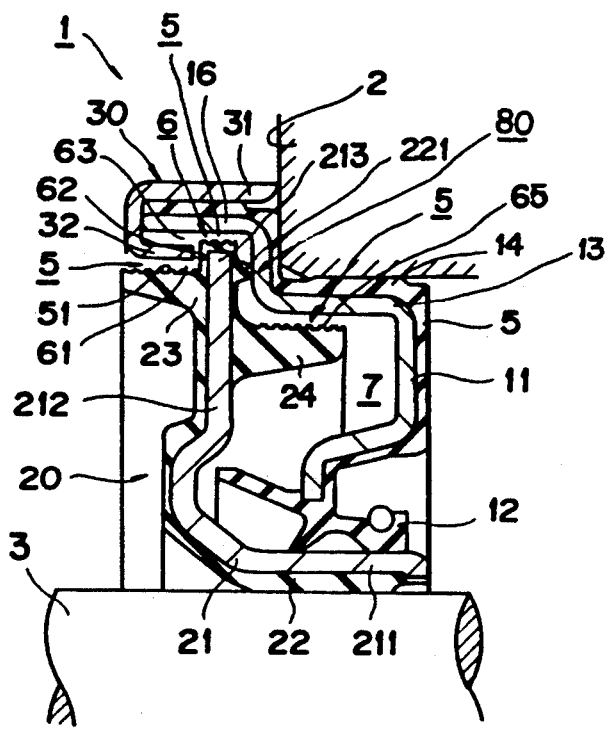

Further, FIG. 4 shows a further modification of the first embodiment. The structure of this modification is the same as that of FIG. 1 in terms of the position and configuration of the buffer portion 221 but differs therefrom in the structure of the auxiliary seal portion $S_2$. That is, a second annular rubber protrusion 24 is provided on that end surface of the radially extending portion 212 of the sleeve 21 which is on the side of the cavity portion 7, and a fifth gap 65 is provided between this second rubber protrusion 24 and the inner periphery of the outer peripheral cylindrical portion 13 of the main metal case 11 of the first seal member 10, thus complicating the configuration of the labyrinth gap 6.

Further, a spiral flow passage 5 exerting a fluid pumping action is formed not only in the first gap 61, but also in the second gap 62 and in the fifth gap 65. These spiral flow passages 5 consist of spiral grooves 51 which are respectively formed on the rubber protrusions 23 and 24 on the side of the second seal member 20 and on the outer radial end surface of the sleeve 21. Apart from this, the structure and operation of this modification are the same as those of FIG. 1, so the same reference numerals are used for the identical components, a description of which is omitted.

Figure 5:
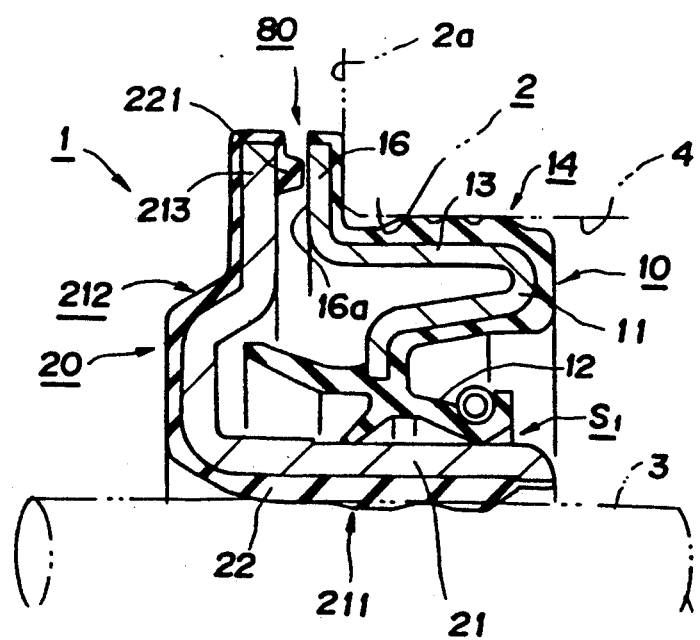

FIG. 5 shows a second embodiment of the present invention. In this second embodiment, the integration metal case 30 of the first embodiment is omitted to simplify the structure, and no spiral flow passage 5 serving as the auxiliary seal portion is provided. The second embodiment has the same basic structure as the first embodiment. That is, a buffer projection 221 is provided on the radially extending portion 212 of the second seal member 20 at a position on the outer side with respect to the housing axle hole 4, and this buffer projection is abutted against the housing end surface 2a through the intermediation of the case flange portion 16 of the first seal member 10. As for the other structural features of this embodiment, they are the same as those of the first embodiment, so the same reference numerals are used for the identical components, a description of which is omitted.

Next, the operation of mounting the rotating shaft 3 for the device of this second embodiment will be described below.

Figure 8:
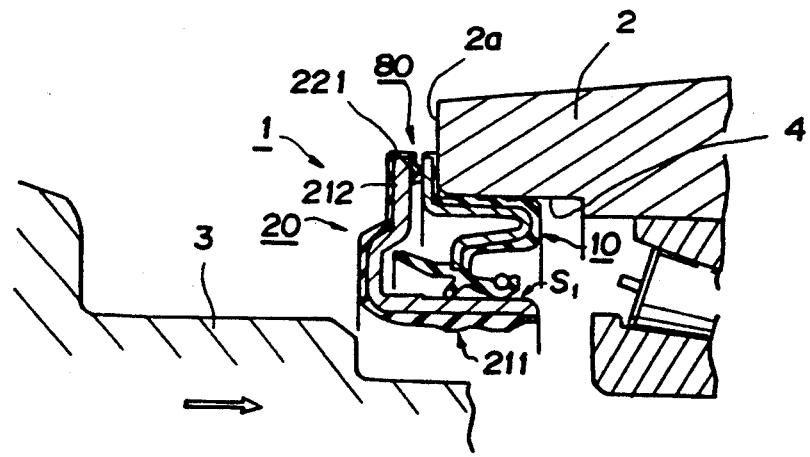
FIGS. 8 through 10 are essential-part longitudinal sectional views illustrating the shaft mounting condition for the sealing device of this invention with reference to the device of FIG. 5.
Figure 9:
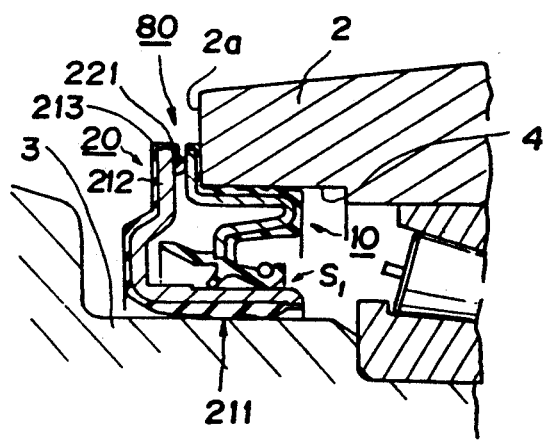

First, as shown in FIG. 8, the first seal member 10 is press-fitted into the axle hole 4 of the housing 2, positioning the member by abutting the case flange portion 16 thereof against the housing end surface 2a. Then, the axially extending portion 211 of the second seal member 20 is inserted into the first seal member 10 to assemble the device, and, as shown in FIG. 9, the rotating shaft 3 is inserted in such a manner as to penetrate inner periphery of the axially extending portion 211.

Figure 10:
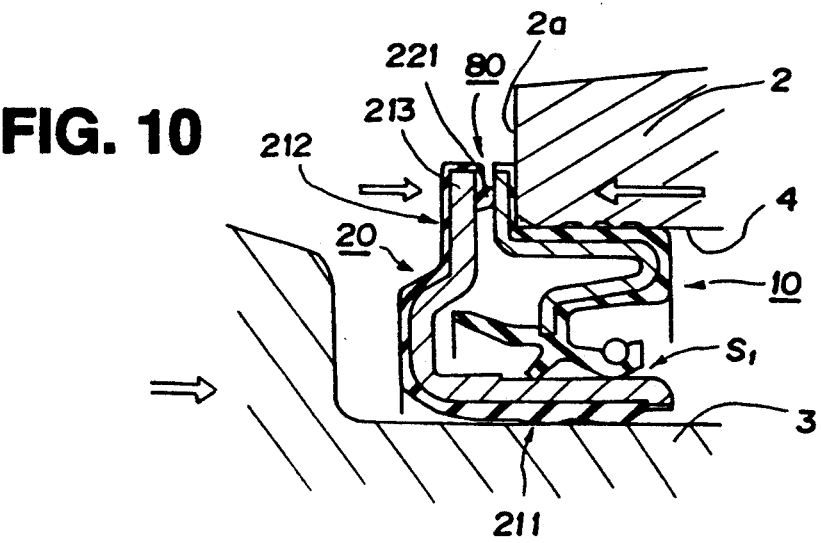
Figure 11:
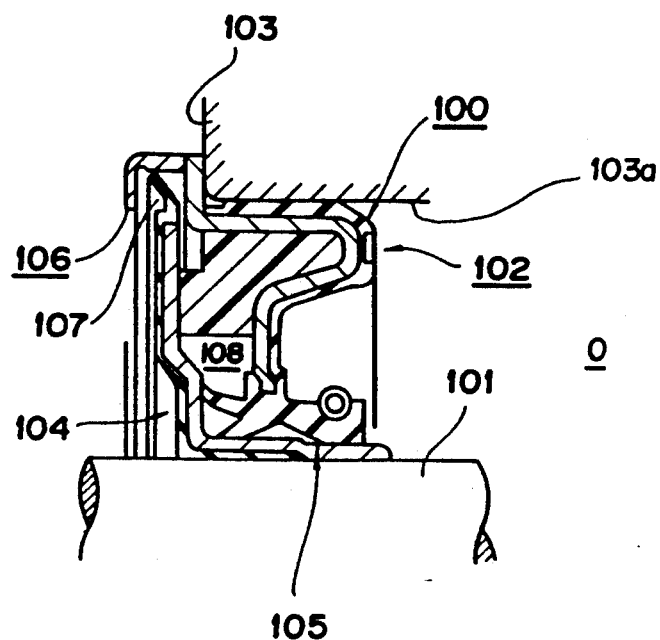
FIG. 11 is a longitudinal sectional view of the essential part of a conventional sealing device.
Figure 12:
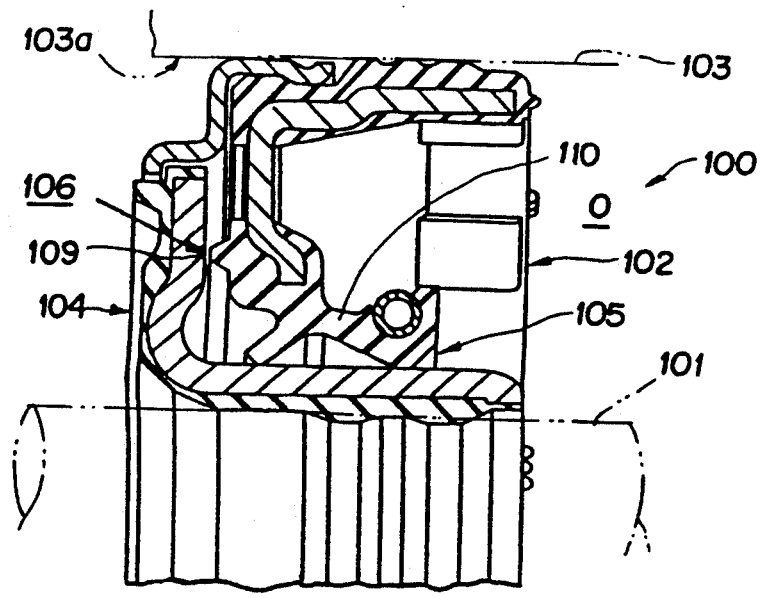
FIG. 12 is a longitudinal sectional view of the essential part of another conventional sealing device.

When performing this shaft mounting operation, the second seal member 20 is pressed towards the inside of the axle hole 4 together with the rotating shaft 3, and the outer radial end portion 213 of the radially extending portion 212 is pressed against the case flange portion 16 of the first seal member 10 that is abutted against the housing end surface 2a. Then, the axial load is buffered by the buffer projection 221, and, as shown in FIG. 10, borne by the housing end surface 2a, so that it does not act on the first seal member 10.

Thus, the axial load is not borne between the first and second seal members 10 and 20 but by the housing end surface 2a, so that there is no action of bending moment which is unnecessary for the first seal member 10. Accordingly, an appropriate contact condition can be maintained without involving any deformation of the main seal lip 12.

Further, even when heat is generated by the buffer projection 221 and the case flange portion 16 of the first seal member 10 during the operation of the sealing device as a result of a sliding movement, a satisfactory heat radiation is effected since they are situated outside the axle hole 4. Further, since they are also spaced away from the main seal portion $S_1$, the thermal deterioration of the main seal lip 12 can be restrained as far as possible.

Figure 6:
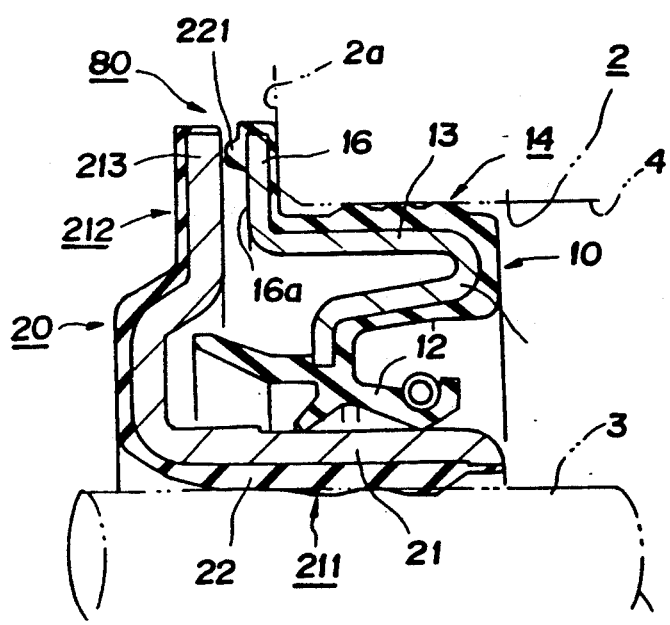
FIG. 6 is a longitudinal sectional view of the essential part of a modification of the second embodiment.

FIG. 6 shows a modification of the second embodiment of the present invention. In this modification, the buffer projection 221 constituting the buffer portion 80 is provided on the side of the case flange portion 16 of the first seal member 10. Apart from this, this modification has the same structure as that of FIG. 5, so the same reference numerals are used for the same components, a description of which is omitted.

Figure 7:
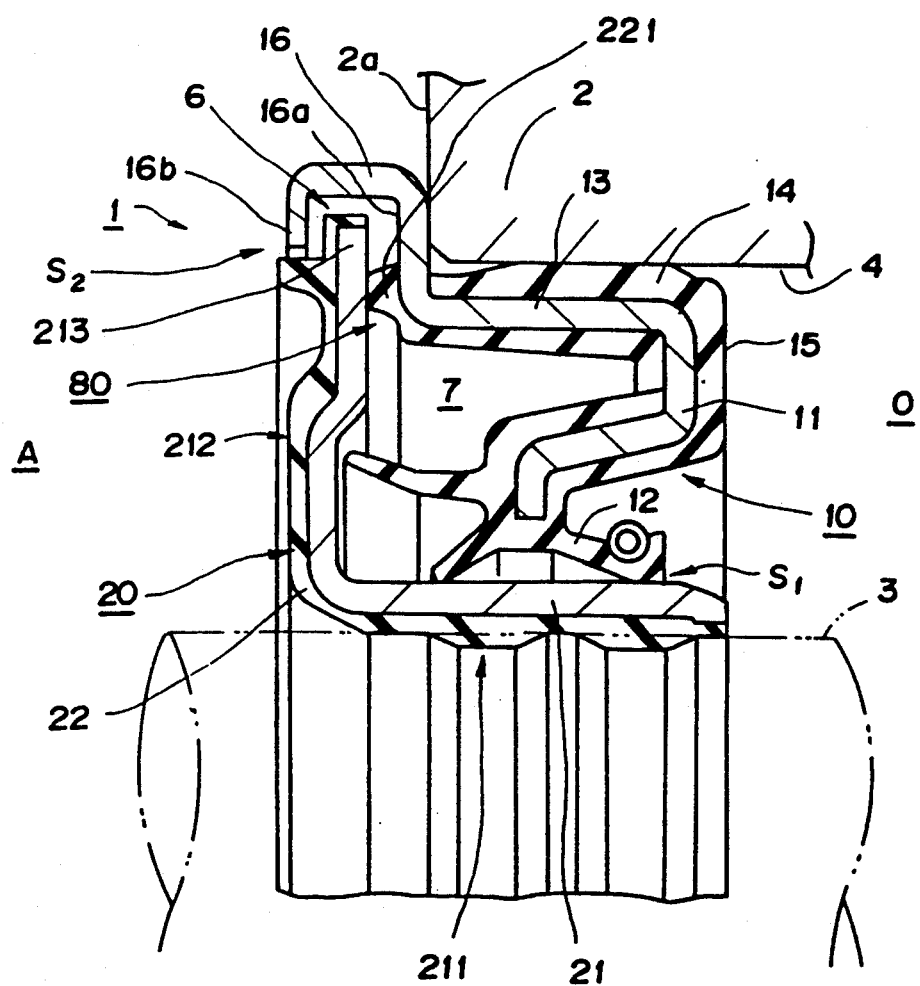
FIG. 7 is a longitudinal sectional view of the essential part of a still further modification of the second embodiment.

Further, FIG. 7 shows a still further modification of this second embodiment. This modification has basically the same construction as that of FIG. 6, but differs therefrom in that the front end portion of the case flange portion 16 is bent to exhibit a U-shaped sectional configuration, with the labyrinth gap 6 being formed between this bent portion 16b and the outer radial end portion 213 of the radially extending portion 212 of the sleeve 21. In this labyrinth gap 6, no spiral flow passage is provided as in the first embodiment.

The construction and operation of this modification are the same as those of FIG. 5, so the same reference numerals are used for the same construction and operation, a description of which is omitted.

INDUSTRIAL APPLICABILITY

Thus, the present invention can be applied to sealed portions for rotating shafts in general.

In particular, with the sealing device of this invention, external foreign matter is forcibly discharged by providing in a non-contact-type auxiliary seal portion a spiral flow passage exerting a screw pump action. Further, a buffer portion is provided outside the axle hole so that the axial load may be borne by the housing end surface. Thus, the sealing device of this invention is suitable for use in rotating shaft bearing portions used in a severe environment, e.g., bearing portions in the differential pinion section, transmission, etc. of an automobile.

What is claimed is:

1. A sealing device for effecting sealing between two members adapted for concentric relative rotation, of the type in which there is provided between a pair of annular seal members respectively attached to said two members, a main seal portion for sealing an object of sealing and an auxiliary seal portion which is provided on the opposite side of said object of sealing with respect to said main seal portion and which serves to prevent intrusion of external foreign matter into said main seal portion;
   wherein said auxiliary seal portion comprises a minute gap having a spiral flow passage which exerts a screw pump action to discharge any external foreign matter to the side opposite to said main seal portion by the relative rotation of said two seal members;
   one member being sealed comprising a housing having an axial hole, said axial hole having a peripheral surface;
   one annular seal member comprising an axially extending portion disposed in the axial hole of said housing and a radially extending portion extending radially outward from the peripheral surface of the axial hole and abutting an end of the housing;
   another annular seal member comprising a radially extending portion spaced from and opposed to the radially extending portion of said one annular seal member;
   a buffer member for buffering axial load disposed between the radially extending portion of said another seal member and the radially extending portion of said one seal member at a location radially outward from said peripheral surface of said axial hole.

2. A sealing device as claimed in claim 1, wherein said minute gap is a labyrinth gap.

3. A sealing device as claimed in one of claims 1 or 2, wherein said spiral flow passage is formed by providing a projection on a surface adjacent to said minute gap.

4. A sealing device as claimed in one of claims 1 or 2, wherein said spiral flow passage is formed by providing a spiral groove on a surface adjacent to said minute gap.

5. A sealing device as claimed in one of claims 1 or 2, wherein the two members between which sealing is to be effected are a housing and a rotating shaft which are concentrically assembled together; said first seal member being fitted fluid-tight into the inner periphery of an axle hole of said housing and having on the inner peripheral side of said first seal member a seal lip; said second seal member being equipped with an axially extending portion which is fitted fluid-tight onto the outer periphery of said rotating shaft and a radially extending portion which extends radially from that end portion of said axially extending portion which is spaced farther away from the object of sealing; said seal lip being in a slidable sealing contact with the outer periphery of said axially extending portion to comprise said main seal portion; and an auxiliary seal portion being provided between the outer radial end portion of said radially extending portion and said first seal member.

6. A sealing device as claimed in claim 5, wherein said first and second seal members are integrally connected with each other through the intermediation of an integrating member, one end of which is fixed to said first seal member and the other end being engageable with that side of said radially extending portion which is spaced farther away from the object of sealing while providing between said integrating member and the outer radial end portion of said radially extending portion of said second seal member a minute gap which comprises said auxiliary seal portion.

7. A sealing device as claimed in claim 6, wherein provided on that side surface of the outer radial end portion of said radially extending portion which is spaced farther away from the object of sealing is an annular protrusion forming between said protrusion and said integrating member a minute gap which comprises said auxiliary seal portion.

8. A sealing device as claimed in claim 5, wherein provided on that side surface of the outer radial end portion of said radially extending portion which is nearer to the object of sealing is an annular protrusion forming between said protrusion and the inner periphery of the outer peripheral fitting portion of said first seal member that is fitted into said axle hole a minute gap which comprises said auxiliary seal portion.

9. A sealing device of the type in which seal portions that are in a slidable sealing contact with each other are formed between a first seal member fitted fluid-tight into the inner periphery of an axle hole of a housing and a second seal member fitted fluid-tight onto a shaft inserted into the axle hole of said housing in such a manner as to allow relative rotation;
   said first seal member having an outer peripheral portion fitted into the inner periphery of the axial hole of said housing, said first seal member further having a flange portion connected to and extending radially outward from said outer peripheral portion, with said flange portion abutted against an end surface of said housing;
   wherein said second seal member is equipped with a radially extending portion situated opposed to said flange portion of said first seal member; and wherein a buffer portion for buffering axial load is provided between said flange portion and said radially extending portion;
   said buffer portion being located radially outward from the connection of said first seal member flange portion to said first seal member outer peripheral portion.

10. A sealing device as claimed in claim 9, wherein said buffer portion comprises a buffer projection provided on the radially extending portion of said second seal member.

11. A sealing device as claimed in claim 9, wherein said buffer portion comprises a buffer projection provided on the flange portion of said first seal member.

12. A sealing device as claimed in one of claims 9 or 10, wherein said first seal member has on its inner peripheral side a seal lip, and wherein said second seal member is equipped with an axially extending portion which is fitted fluid-tight onto the outer periphery of the rotating shaft wherein said radially extending portion extends radially outwards from an end portion of said axially extending portion which is spaced farther away from the object of sealing, said seal lip being in a slidable sealing contact with the outer periphery of said axially extending portion.

13. A sealing device as claimed in one of claims 9, 10 or 11, wherein a non-contact-type auxiliary seal portion having a minute gap and adapted to prevent intrusion of foreign matter is provided between the flange portion of said first seal member and the radially extending portion of said second seal member.

14. A sealing device as claimed in claim 13, wherein said minute gap is a labyrinth gap.

15. A sealing device as claimed in claim 13, wherein said minute gap has a spiral flow passage which exerts a screw pump action to discharge foreign matter to the side opposite to a main seal portion by utilizing the relative rotation of the two seal members.

16. A sealing device as claimed in claim 15, wherein said spiral flow passage is formed by providing a spiral groove on a surface adjacent to said minute gap.

17. A sealing device as claimed in claim 13, wherein said first and second seal members are integrally connected with each other through the intermediation of an integrating member, one end of which is fixed to said first seal member and the other end being engageable with that side of said radially extending portion which is spaced farther away from the object of sealing while providing between said integrating member and the outer radial end portion of said radially extending portion of said second seal member a minute gap which comprises said auxiliary seal portion.

18. A sealing device as claimed in claim 17, wherein provided on that side surface of the outer radial end portion of said radially extending portion which is spaced farther away from the object of sealing is an annular protrusion forming between said protrusion and said integrating member a minute gap which comprises said auxiliary seal portion.

19. A sealing device as claimed in claim 13, wherein provided on that side surface of the outer radial end portion of said radially extending portion which is nearer to the object of sealing is an annular protrusion forming between said protrusion and the inner periphery of the outer peripheral fitting portion of said first seal member fitted into said axle hole a minute gap, which comprises said auxiliary seal portion.

20. A sealing device as claimed in claim 15, wherein said spiral flow passage is formed by providing a projection on a surface adjacent to said minute gap.

* * * * *